R. T. Gill.
Hay-Spreader & Cocker.
No. 76073. Patented Mar. 31, 1868.

Witnesses:
Theo Tusche
Wm Treurn

Inventor:
R. T. Gill
Per Munn & Co.
Attys.

United States Patent Office.

R. T. GILL, OF POUGHKEEPSIE, NEW YORK.

*Letters Patent No. 76,073, dated March 31, 1868.*

---

IMPROVEMENT IN COMBINED HAY-SPREADERS AND COCKERS.

---

*The Schedule referred to in these Letters Patent and making part of the same.*

---

TO ALL WHOM IT MAY CONCERN:

Be it known that I, R. T. GILL, of Poughkeepsie, in the county of Dutchess, and State of New York, have invented a new and improved Hay-Cocking and Tedding-Machine; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
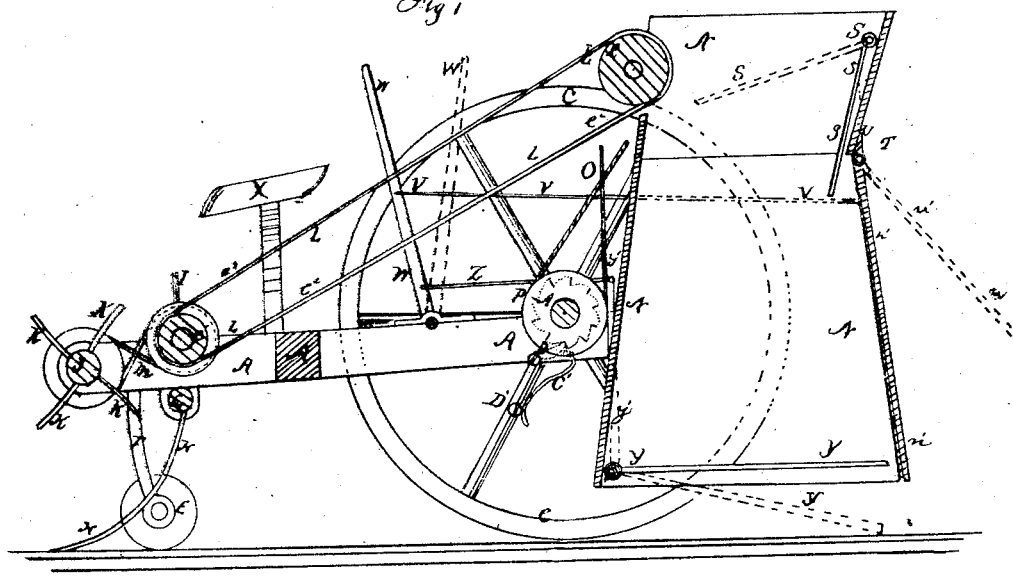
Figure 1 is a vertical section of my improved machine, taken through the line $x\ x$, fig. 1.
Figure 2:
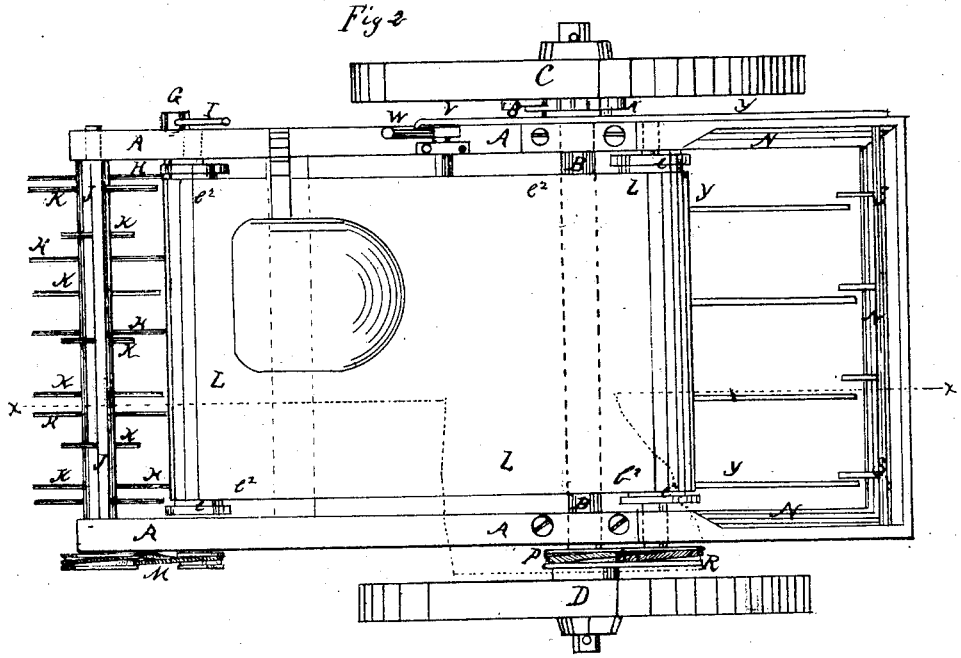
Figure 2 is a top or plan view of the same.

My invention has for its object to furnish an improved machine, by means of which hay may be cocked or tedded rapidly, conveniently, and thoroughly; and it consists in an improved machine formed by the combination of the gatherer, carrier, and receiving-box, having an upper and a lower pivoted grate and a swinging door, and in the receiving-box, furnished with an upper and a lower pivoted grate, and with a swinging door, and in the arrangement of arms, rods, and levers for operating the said grates and door, the whole being constructed and arranged as hereinafter more fully described.

A is the frame of the machine. B is the axle, which revolves in bearings in the frame A, and upon which the wheels C and D revolve. E is a wheel pivoted to an arm, F, attached to the forward part of the frame A, to support the said forward end of the frame, and prevent it from coming too near the ground in passing over uneven surfaces. G is a rake-shaft, to which spring-teeth H are attached, to collect the hay from the ground. I is a lever attached to the end of the shaft G, by means of which the teeth H may be raised from the ground when desired. J is a shaft revolving in bearings in the end of the frame A, and which is provided with radial teeth, K, that take the hay from the teeth H, and transfer it to the carrier L. The shaft J receives motion from the shaft $l^1$ of the carrier L, by means of the band M, passing around pulleys attached to the ends of the shafts J and $l^1$, or by means of gear-wheels attached to the ends of said shafts. L is the carrier, consisting of an endless belt, $l^2$, passing around the rollers or shafts $l^1$ and $l^3$. The carrier L receives the hay from the gatherer G H J K, and discharges it into the box or receiver N. The carrier L receives motion from the axle B by means of the band O, which passes around the pulley P, attached to the axle B, and around the pulley R, attached to the journal of the shaft $l^3$. The gatherer G H J K may be replaced by any other of suitable form, its particular form being immaterial. If desired, in the space between the shafts $l^1$ and $l^3$ may be placed an inclined floor or platform, and the endless belt or apron replaced with endless chains, connected at suitable distances by cross-bars, having teeth attached to them, which will carry up the hay, and deposit in the receiver-box N.

N is the receiver-box, the lower part of which should be made flaring towards the bottom, and the sides should also flare towards the rear, so that the hay, when released, may pass out freely and all together. The rear side of the box I prefer to make nearly vertical, so that the upper grate S, when dropped down, may lie closely along the said side. The rear side $n'$ of the lower part of the receiver-box N is made in the form of a swinging door, which is attached at its upper edge to a bar, T, working in bearings in the frame of the box N. To the end of the bar T is attached, or upon it is formed, a lever or arms, U, extending both above and below the said bar. To the lower end of the arm or lever U is pivoted the end of a connecting-rod, V, the other end of which is pivoted to the lever W. The rod V and lever U should be adjustably pivoted to each other, so that the throw of the said lever U may be regulated at pleasure. The lower end of the lever W is pivoted to the frame A of the machine, and its upper end extends up into such a position as to be reached and operated by the driver from his seat, X.

S is the upper grate, which is pivoted in the upper part of the box N by its rear side-bar, as shown in the drawings. Upon the projecting end of said side-bar is formed, or to it is attached, an arm, S', extending down into such a position as to be reached and operated by the upper end of the lever U. Y is the lower grate, which is placed at the bottom of the box N, and which is pivoted to the sides of said box by its front side-bar. Upon the projecting end of said bar is formed, or to it is attached, an arm, $y'$, to the upper end of which is pivoted the end of the connecting-rod Z, the other end of which is pivoted to the lever W.

A' is a ratchet-wheel attached to the axle B. B' is a pawl pivoted to the wheel C. C' is a spring, one end of which is attached to the pawl B', and its other end rests against a stop-pin, D', attached to a spoke of the wheel C. The spring C', when in the position shown in fig. 1, holds the pawl B' down against the teeth of the ratchet-wheel A', so that the machine cannot be drawn forward without operating the various parts of said machine; but, if the free end of the spring C' is moved to the other side of the stop-pin D', it then holds the pawl away from the ratchet-wheel, so that the machine may be moved in either direction without revolving the axle B, or operating the other parts of the said machine.

In using the machine, the hay is collected by the gatherer G H J K, and carried up and discharged into the box N by the carrier L. When a sufficient quantity has been received in said box to form a cock, the lever W is moved back into the position shown in red in fig. 1. This raises the upper grate S into the position shown in red in fig. 1, preventing any more hay from passing into the said box. The same movement drops the lower grate Y, and raises the swinging door n', so that, as the machine moves on, the hay-cock is left standing upon the ground. The lever W is then released, allowing the grates and door to take their original positions until enough hay has been collected to form another cock. By turning the lower grate Y up against the forward side of the box N, and securing it in that position, the machine may be used with great advantage for tedding the hay, stirring it thoroughly, and leaving it spread evenly over the ground.

What I claim as new, and desire to secure by Letters Patent, is—

1. An improved machine for cocking and tedding hay, formed by the combination of the gatherer G H J K and carrier L, or their equivalents, with the receiver-box N, having an upper grate, S, a lower grate, Y, and a swinging door, n', substantially as herein shown and described.

2. The receiver-box N, furnished with an upper grate, S, a lower grate, Y, and a swinging door n', substantially as herein shown and described.

3. The combination and arrangement of the arm y', connecting-rod Z, lever W, connecting-rod V, and lever U with each other and with the grate Y, grate S, and swinging door n', substantially as herein shown and described, and for the purpose set forth.

R. T. GILL.

Witnesses:
    JAMES BLANCHARD,
    ALBERT ANTHER.